United States Patent
Aoki et al.

(10) Patent No.: US 6,279,061 B1
(45) Date of Patent: Aug. 21, 2001

(54) DATA PROCESSING APPARATUS FOR MODIFYING INFORMATION DATA BETWEEN TWO INTERFACES AND USING CONTROL DATA OF ONE INTERFACE TO CONTROL A SECOND INTERFACE

(75) Inventors: Yukihiko Aoki, Tokyo; Shinichi Suenaga; Takeshi Miura, both of Kanagawa, all of (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/037,293

(22) Filed: Mar. 9, 1998

(30) Foreign Application Priority Data

Mar. 12, 1997 (JP) .................................................. 9-057506

(51) Int. Cl.[7] .................................................. G06F 13/38
(52) U.S. Cl. .................................... 710/65; 710/1; 703/27
(58) Field of Search .................................... 709/300, 302; 710/1, 129, 62–74; 703/27

(56) References Cited

U.S. PATENT DOCUMENTS

| 5,208,913 | * | 5/1993 | Yamamoto | 364/236.3 |
| 5,740,384 | * | 4/1998 | Asthana et al. | 710/126 |
| 6,047,340 | * | 4/2000 | Kase et al. | 710/60 |
| 6,061,747 | * | 5/2000 | Ducaroir et al. | 710/21 |

* cited by examiner

Primary Examiner—Xuan M. Thai
(74) Attorney, Agent, or Firm—Frommer Lawrence & Haug LLP; William S. Frommer

(57) ABSTRACT

It is intended to make it possible to deal with an electronic apparatus as if it were a different kind of electronic apparatus. An editor outputs a command to be used in controlling a video cassette recorder to a 1394 communication section via an IEEE 1394 bus. A system controller receives the command according to the IEEE 1394 interface via a LINK and converts it into a command according to the IDE interface, which is output to an IDE controller. The IDE controller converts data that is input via the LINK and a FIFO memory into a command according to the IDE interface and supplies it to a HDD via an IDE interface.

15 Claims, 8 Drawing Sheets

FIG.3

CTS : COMMAND AND TRANSACTION SET

| | |
|---|---|
| 0000 | AV/C COMMAND |
| 0001 | RESERVED FOR CAL |
| 0010 | RESERVED FOR EHS |
| ⁓ | |
| 1110 | VENDOR UNIQUE COMMAND |
| 1111 | CTS EXTENSION CODE |

FIG.5

CTYPE / RESPONSE

| | | |
|---|---|---|
| COMMAND | 0000 | CONTROL |
| | 0001 | STATUS |
| | 0010 | INQUIRY |
| | 0011 | NOTIFY |
| | 0100 ～ 0111 | (RESERVED) |
| RESPONSE | 1000 | NOT IMPLEMENTED |
| | 1001 | ACCEPTED |
| | 1010 | REJECTED |
| | 1011 | IN TRANSITION |
| | 1100 | IMPLEMENTED / STABLE |
| | 1101 | CHANGED |
| | 1110 | (RESERVED) |
| | 1111 | INTERIM |

FIG.6

SUBUNIT_TYPE

| | |
|---|---|
| 00000 | MONITOR |
| ～ | (RESERVED) |
| 00100 | VCR |
| 00101 | TUNER |
| 00111 | CAMERA |
| ～ | (RESERVED) |
| 11111 | EXTENDED SUBUNIT* |

*COMMAND IS DIRECTED TO UNIT WHEN SUBUNIT ID FIELD IS "111"

OPCODE : OPERATION CODE

| | |
|---|---|
| 00h | VENDOR-DEPENDENT |
| 50h | SEARCH MODE |
| 52h | ATN |
| 60h | OPEN MIC |
| 61h | READ MIC |
| 62h | WRITE MIC |
| C1h | LOAD MEDIUM |
| C2h | RECORD |
| C3h | PLAY |
| C4h | WIND |
| ～ | ～ |

※EACH SUBUNIT HAS ITS OWN OPC / OPR TABLE

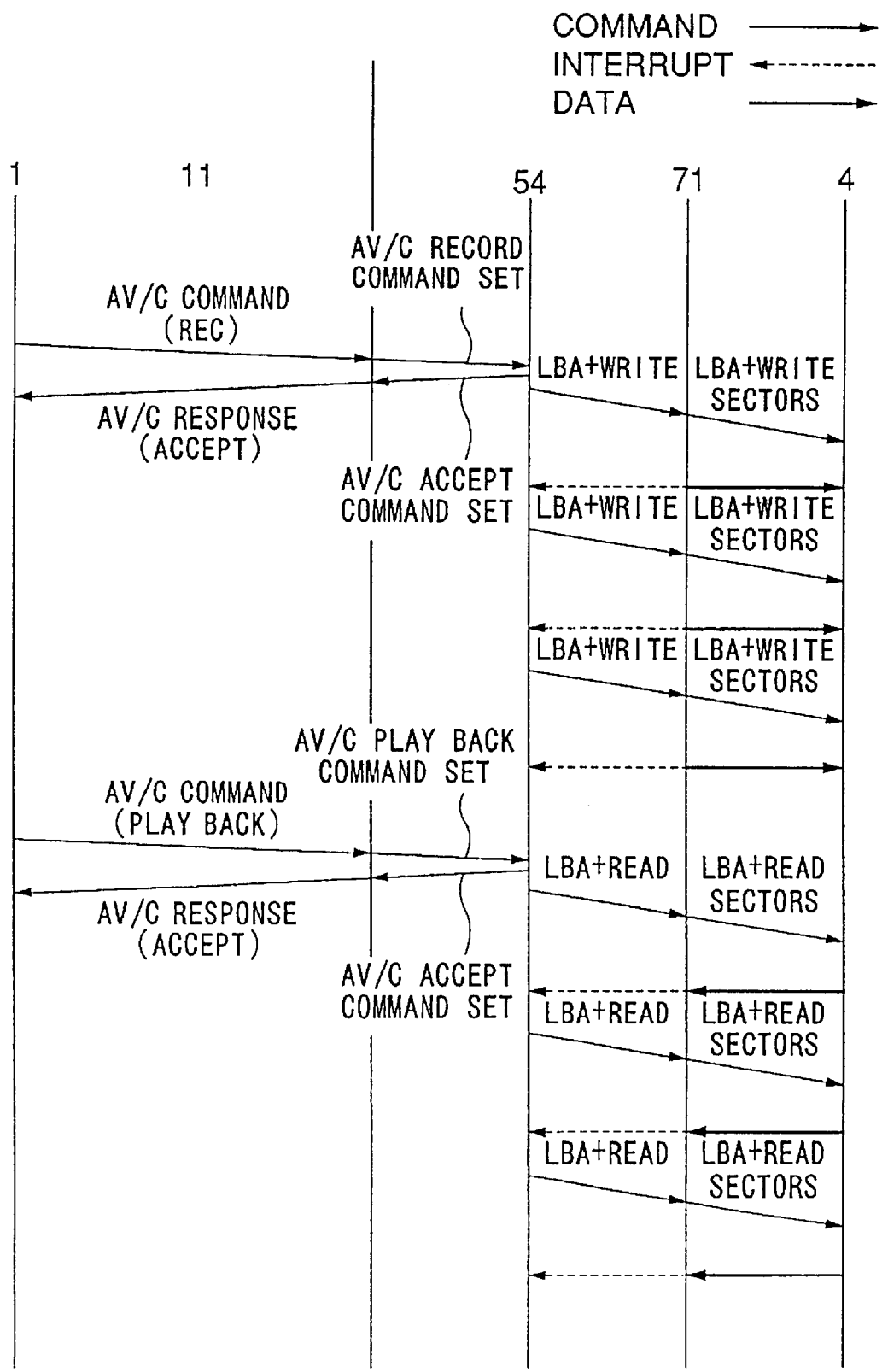

DATA PROCESSING APPARATUS FOR MODIFYING INFORMATION DATA BETWEEN TWO INTERFACES AND USING CONTROL DATA OF ONE INTERFACE TO CONTROL A SECOND INTERFACE

BACKGROUND OF THE INVENTION

1. Field of the Invention

The present invention relates to an electronic equipment control apparatus and method, and particularly to an electronic equipment control apparatus and method which allow a first electronic apparatus to be controlled in the same manner as a second electronic apparatus that is of a different kind than the first electronic apparatus.

2. Description of the Related Art

Video signals are mainly recorded on magnetic tapes such as used in the analog video cassette recorder and the digital cassette recorder. In contrast, for recording of audio signals, disc-shaped recording media such as the mini-disc (MD) are marketed as well as cassette tapes. Since video signals have more information than audio signals, tapes, which are of relatively low cost, are used in consumer electronic equipment for recording of video signals.

However, in recent years the cost of the hard disk has been reduced considerably and it is now attempted to record a video signal on the hard disk.

However, various interfaces that have been developed so far for recording of video signals on a recording medium are in many cases intended for recording of video signals on a magnetic tape. Therefore, to record video signals on a hard disk, it is necessary to develop a special interface for such a purpose, which causes a problem of cost increase.

SUMMARY OF THE INVENTION

The present invention has been made in view of the above circumstances, and an object of the invention is therefore to make it possible to record a video signal on a hard disk easily at a low cost.

According to the invention, there is provided a data processing apparatus which receives and/or outputs data via first and second interfaces, comprising first control means for receiving and/or outputting data via the first interface, and for converting a format of data that is received via the first interface into a format suitable for output via a second interface; and second control means connected to the first control means, for receiving and/or outputting data via the second interface, and for converting a format of data that is received via the second interface into a format suitable for output via the first interface.

According to another aspect of the invention, there is provided a data transmission method in a data processing apparatus which receives and/or outputs data via first and second interfaces, comprising the steps of receiving data via the first interface or the second interface; converting a format of the received data into a format suitable for output via the second interface when the data was received via the first interface, and into a format suitable for output via the first interface when the data was received via the second interface; and outputting the converted data via the second interface when the data was received via the first interface, and via the first interface when the data was received via the second interface.

BRIEF DESCRIPTION OF THE DRAWINGS

FIG. 3 shows examples of "CTS" that is shown in FIG. 2;

FIG. 5 shows examples of "ctype/response" that is shown in FIG. 4;

FIG. 6 shows examples of "subunit_type" and "opcode" that are shown in FIG. 4;

FIG. 9 illustrates exchanges of commands and responses in a case of recording and reproducing data in the AV system of FIG. 1.

DETAILED DESCRIPTION OF THE PREFERRED EMBODIMENT

Figure 1:
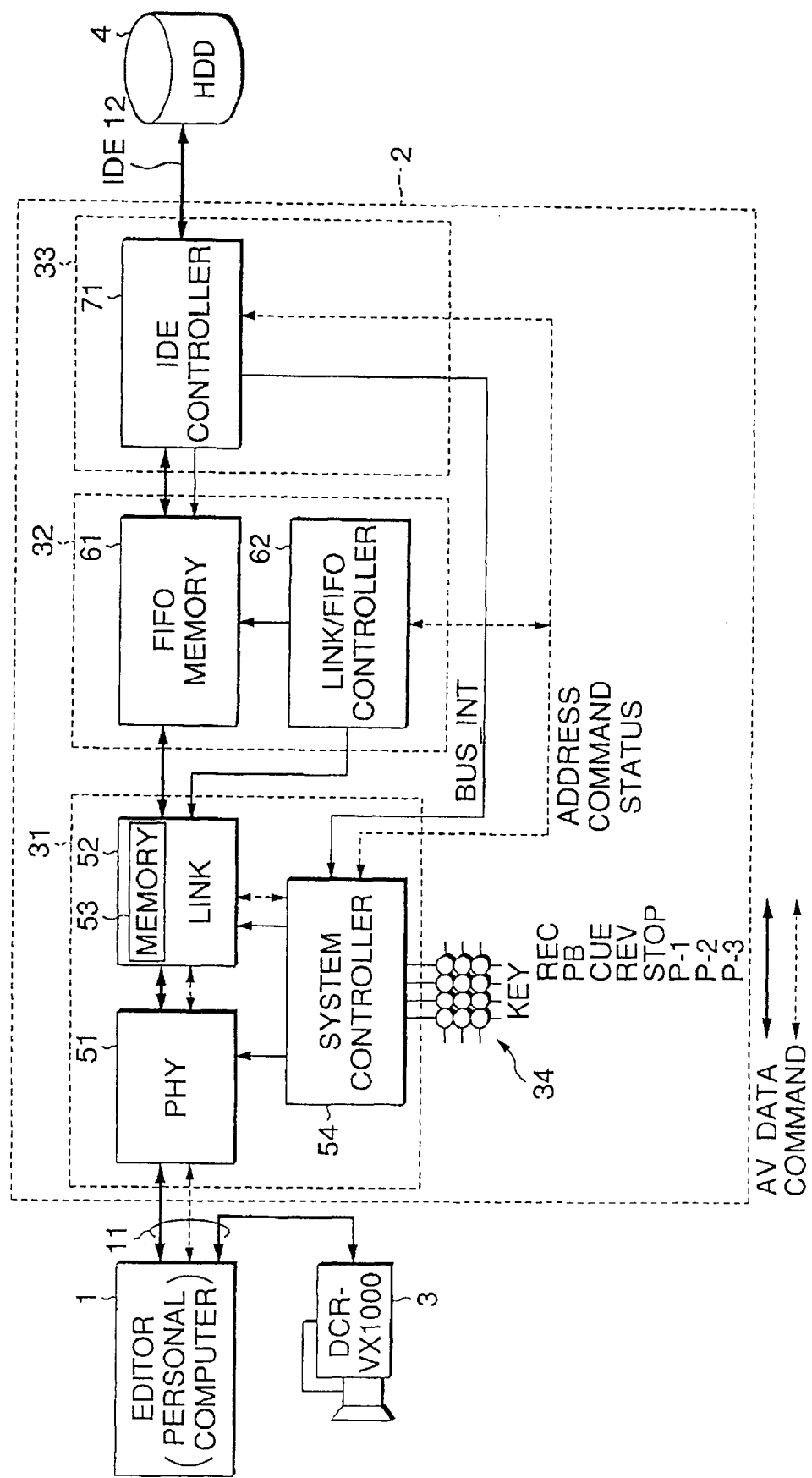
FIG. 1 is a block diagram showing an exemplary configuration of an AV system to which an electronic equipment control apparatus of the invention is applied.

FIG. 1 shows an exemplary configuration of an AV system to which an electronic equipment control apparatus of the invention is applied. An editor 1 that is a personal computer is connected to a digital cassette recorder (DCR) 3 via an IEEE (Institute of Electrical and Electronics Engineers) 1394 high-performance serial bus (hereinafter referred to simply as "1394 bus") 11. The editor 1 edits video data that is digitally recorded on a cassette tape incorporated in the DCR 3. A conversion device 2 is also connected to the editor 1 via the 1394 bus 11. A hard disk drive (HDD) 4 is connected to the conversion device 2 via an IDE (integrated drive electronics) interface 12. The IDE interface 12 is an interface mainly used for hard discs that require a high data transfer rate.

The conversion device 2 is constituted of a 1394 communication section 31 that is connected to the editor 1 via the 1394 bus 11, an IDE control section 33 that is connected to the HDD 4 via the IDE interface 12, and a storage section 32 that is connected between the 1394 communication section 31 and the IDE control section 33.

A PHY 51 of the 1394 communication section 31 performs DS (data-strobe)-coding demodulation on packets including image data that are input via the 1394 bus 11 and outputs the demodulated packets to a LINK 52. Further, the PHY 51 performs DS-coding modulation on packets that are supplied from the LINK 52 and outputs the modulated packets to the editor 1 via the 1394 bus 11. The LINK 52 extracts image data from packets that are supplied from the PHY 51 and supplies the extracted image data to a FIFO memory 61 of the storage section 32. Further, the LINK 52 packetizes image data that is supplied from the FIFO memory 61 and outputs resulting packets to the PHY 51. Incorporating a memory 53, the LINK 52 extracts a command from packets that are input from the PHY 51 and stores it in the memory 53. A system controller 54 controls the PHY 51 and the LINK 52 as well as the storage section 32 and the IDE control section 33 in response to instructions coming from an input section 34 that is constituted of various keys and switches etc.

The storage section 32 has a LINK/FIFO controller 62 in addition to the FIFO memory 61. The FIFO memory 61 stores data that are supplied from the LINK 52 and outputs the stored data to an IDE controller 71 of the IDE control section 33 in order from the first input data. Conversely, the FIFO memory 61 stores data that are supplied from the IDE controller 71 and outputs the stored data to the LINK 52 in order from the first input data. The data writing and reading to and from the FIFO memory 61 are controlled by the LINK/FIFO controller 62.

The IDE controller 71 of the IDE control section 33 converts an image data block that is supplied from the FIFO memory 61 into a data block suitable for the IDE interface 12, and supplies it to the HDD 4 via the IDE interface 12 with given timing and has it stored therein. (Although actually the term "image data" includes audio data, system data, etc. in addition to image data, this term will be used in the following description when no discrimination is needed among those data.) The IDE controller 71 converts, into an original data block, image data suitable for the IDE interface that is supplied from the HDD 4 via the IDE interface 12 and outputs it to the FIFO memory 61.

For example, the IDE controller 71 may be one that was previously proposed by the present assignee in Japanese Patent Application No. Hei. 8-111443.

As for the 1394 bus 11, node numbers are assigned to electronic apparatuses (in this example, the editor 1 and the conversion device 2) connected thereto and communications are performed basically periodically between those electronic apparatuses at unit intervals of 125 $\mu$s. The mode in which periodic communication is performed is an isochronous mode, and the mode in which communication is performed irrespective of the above period is also set as an asynchronous mode. Commands are transferred mainly during asynchronous mode periods and image data are transferred mainly during isochronous mode periods.

Figure 2:
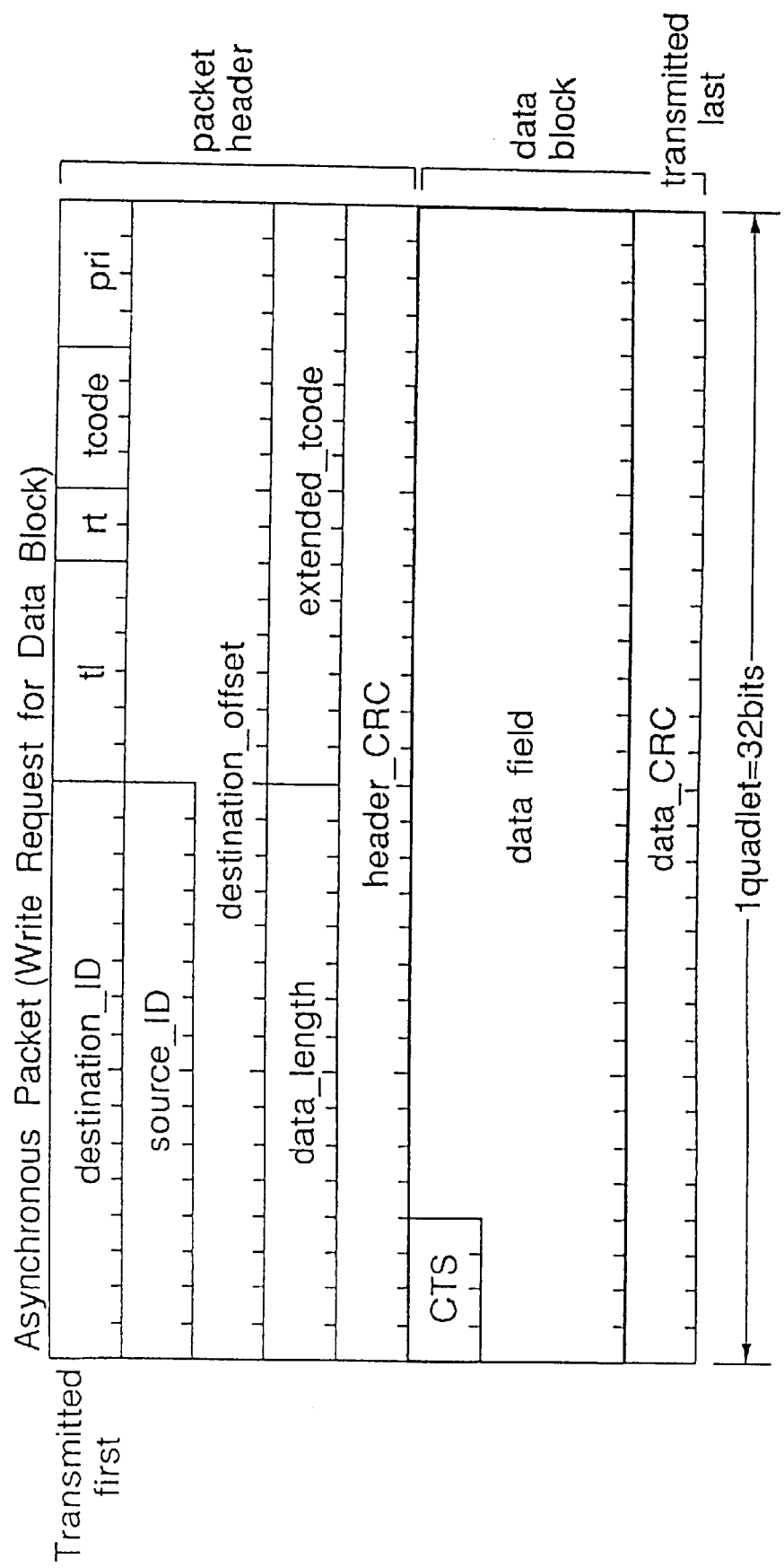
FIG. 2 shows a format of an asynchronous packet.

Three kinds of asynchronous packets, i.e., a write packet, a read packet, and a lock packet, are used in the 1394 bus 11. FIG. 2 shows the format of the write packet (write request for data block) among those asynchronous packets. Item "destination_ID" of the header of this packet, represents the ID of a data transfer destination and specifically describes the node number of an electronic apparatus that is prescribed in connection with the 1394 bus 11. Item "tl" (transact label) represents the number of the packet, and "rt" (retry code) is a code that indicates whether the packet is being transmitted first or being transmitted again. Item "tcode" is a code as an instruction to write a message to a command register or a response register (described later). Item "pri" (priority) represents the priority rank of the packet.

Item "Nsource_ID" represents the ID of a data transfer source and specifically describes the node number of an electronic apparatus as a data transfer source. Item "destination_offset" represents the addresses of the command register and the response register (described later). Item "data_length" represents the data length of "data field." Item "extended_tcode" is used when "tcode" is extended. Item "header_CRC" represents a value of CRC calculation for checksum of the above packet header.

A data block is disposed after the above packet header. "CTS" (command and transaction set) is described at the head of "data field" of the data block. "CTS" is prescribed as shown in FIG. 3. For example, "CTS" being "0000" indicates that information described in "data field" is an AV/C command. Item "data_CRC" is disposed after "data field."

Figure 4:
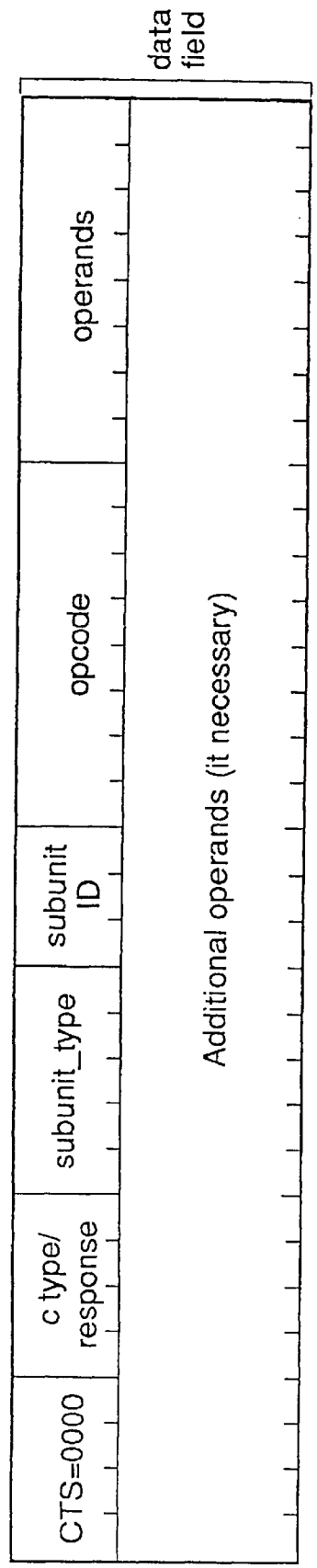
FIG. 4 shows a format of "data field" that is shown in FIG. 2.

In this embodiment, the AV/C command is used as "CTS" and hence "0000" is described in "CTS." FIG. 4 shows a format of "data field" in a case where "CTS" is "0000" (AV/C command). Item "ctype/response" is disposed after "CTS." As shown in FIG. 5, "ctype/response" is for discrimination among commands and responses. For example, a value "0000" of "ctype/response" represents a command "CONTROL" and "0001" represents a command "STA-TUS." Further, a value "1000" of "ctype/response" represents a response "NOT IMPLEMENTED" and "1001" represents a response "ACCEPTED."

As shown in FIG. 6, "subunit_type" describes the type of a subunit to which this command is applied. For example, "subunit_type" is made "00000" if the subunit type is a monitor and it is made "00100" if the subunit is a video cassette recorder (VCR).

Item "opcode" is an operation code. For example, where "subunit_type" is "00100" (VCR), "C3h" of "opcode" represents PLAY and "C2h" represents RECORD.

Item "operands" represents information that is needed by "opcode" and a playback speed and direction are described there.

TABLE 1

| No. | CTS | ctype | sub-unit_type | sub-unit ID | opcode | operand 0 | 1 | 2 | 3 | 4 |
|---|---|---|---|---|---|---|---|---|---|---|
| 1 | 0000 | 0000 | 00100 | 000 | C3 | 75 | | | | |
| 2 | 0000 | 0000 | 00100 | 000 | C2 | 75 | | | | |
| 3 | 0000 | 0000 | 00100 | 000 | C4 | 60 | | | | |
| 4 | 0000 | 0000 | 00100 | 000 | 51 | 20 | 00 | 01 | 02 | 03 |
| 5 | 0000 | 0000 | 00100 | 000 | 52 | 20 | 00 | 01 | 02 | FF |

Table 1 shows examples of commands. Commands of Nos. 1 to 3 represent playback, recording, and stop, respectively. No. 3 is a command of head search of a position 3 hours 2 minutes 1 second 1 field, No. 4 is a command of head search of track number 00020100, and No. 5 is a command of head search of track number 00020100.

Figure 7:
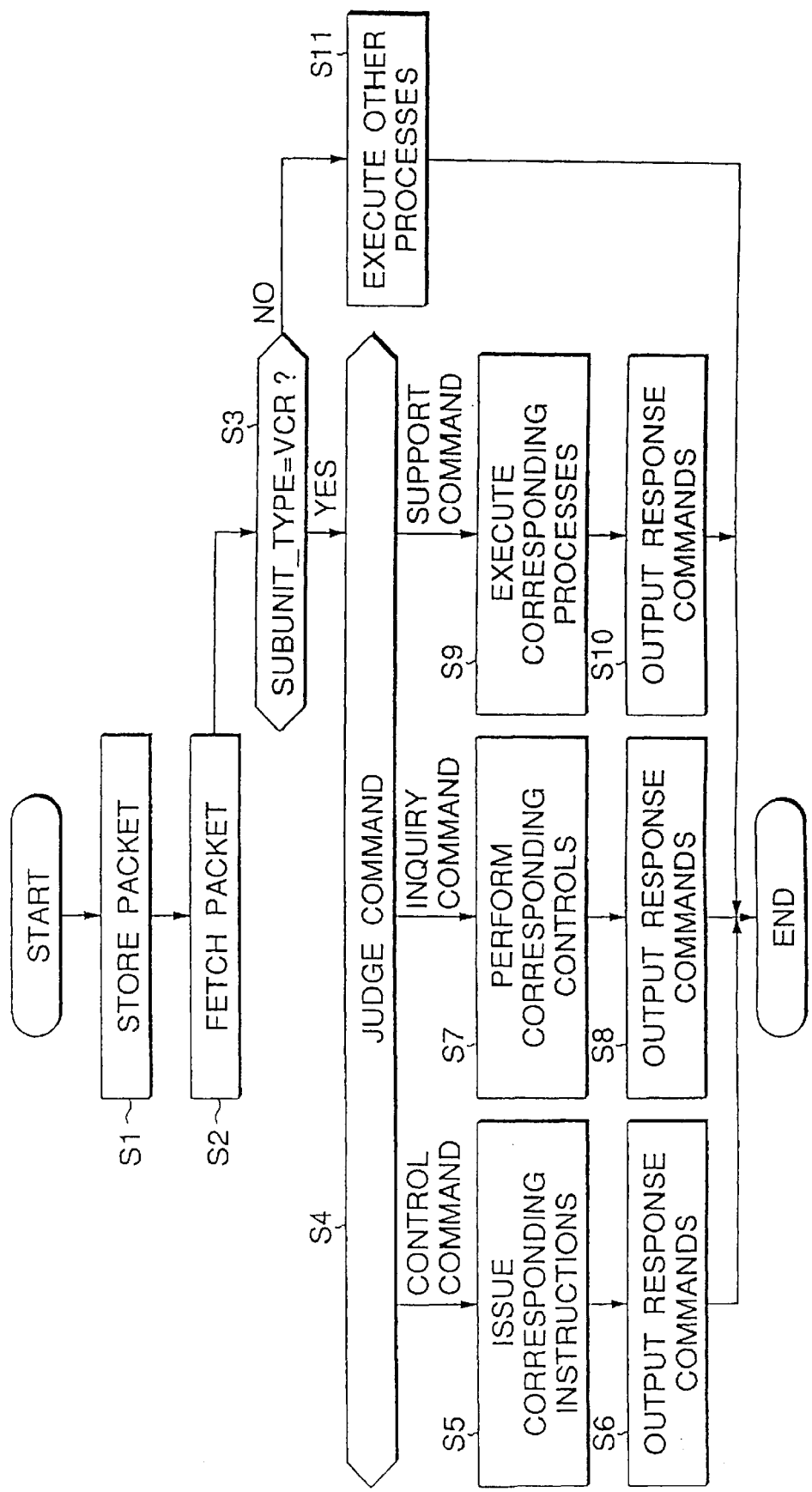
FIG. 7 is a flowchart showing the operation of the AV system of FIG. 1.

Next, the operation of the AV system will be described with reference to a flowchart of FIG. 7. When a certain instruction to the HDD 4 is input by manipulating the editor 1, for instance, a command packet corresponding to the input is supplied from the editor 1 to the PHY 51 of the conversion device 2 via the 1394 bus 11. The PHY 51 DS-coding-demodulates the command packet that has been supplied via the 1194 bus 11, and outputs a resulting packet to the LINK 52. The LINK 52 extracts a command that is included in the asynchronous packet, and stores it in the memory 53 that is incorporated in the LINK 52 at step S1.

In transmitting a command to the conversion device 2, the editor 1 specifies, as "destination_ID" shown in FIG. 2, the node number that is assigned to the conversion device 2. Therefore, the conversion device 2 stores only packets that assigned its own node number in its memory 53.

Then, the system controller 54 fetches the packet that is stored in the memory 53 at step S2, and judges whether "subunit_type" of the packet is VCR at step S3. In recording or reproducing image data onto or from the HDD 4, the editor 1 executes the same process as it would do on a video cassette recorder (VCR). This is the reason why VCR (00100) is specified as "subunit_type" in "data field" of the asynchronous packet that is output from the editor 1. For the same reason, "opcode" and "operands" of "data field" describe the same values as in recording or reproducing data onto or from a VCR.

If "subunit_type" is judged to be VCR at step S3, the process goes to step S4, where the system controller 54 judges "opcode." Examples of "opcode" are control commands (for instance, "CONTROL"), inquiry commands (for instance, "INQUIRY"), and support commands (for instance, "STATUS").

The control commands include a recording commands, playback commands, and stop commands. An example of the recording commands is RECORD and an example of the playback commands is PLAY.

If "opcode" is judged to be a control command at step S4, the process goes to step S5, where the system controller 54 issues instructions corresponding to the control command to the LINK/FIFO controller 62, the IDE controller 71, etc. to have them execute predetermined processes.

For example, if "ctype/response" is "0000" (CONTROL) and "opcode" is "C2h" (RECORD), the system controller 54 controls the LINK 52 to have it extract data included in an isochronous packet that is input from the PHY 51 and supply the extracted data to the FIFO memory 61. Further, the system controller 54 outputs an instruction to the LINK/FIFO controller 62 to cause the FIFO memory 61 to store image data that is input from the LINK 52. Further, the system controller 54 outputs an instruction to the IDE controller 71 to have it convert the image data that is input from the FIFO memory 61 into an image data block suitable for the IDE interface 12, which is supplied to the HDD 4 via the IDE interface 12 and recorded thereon.

The FIFO memory 61 sets a full flag when it has stored image data of, for instance, one frame (alternatively, one field or one picture of the MPEG scheme) or more. In response to the setting of the full flag, first the IDE controller 71 supplies the HDD 4 with addresses and commands corresponding to the data to be recorded. Then, the IDE controller 71 reads out image data of one frame from the FIFO memory 61 on a first-in first-out basis, converts the read-out image data into a data block suitable for the IDE interface 12, and outputs it to the HDD 4.

When the amount of stored image data has become smaller than one frame, the FIFO memory 61 cancels the full flag. The FIFO memory 61 again sets a full flag when image data of the next frame is supplied from the LINK 52 and recorded in itself and as a result the amount of stored image data becomes one frame or more.

In this manner, the IDE controller 71 sequentially repeats a process of reading out image data from the FIFO memory 61 on a frame-by-frame basis, converting the read-out image data into a data block suitable for the IDE interface 12, and outputting it to the HDD 4. When the process has been completed, the IDE controller 71 requests the system controller 54 to transfer a new command by outputting a "BUS_INT" (bus interrupt) signal to it.

With the above process, even if the data recording operation temporarily delays due to a seek time or a retry operation of the HDD 4, there does not occur such an event that the write pointer of the FIFO memory 61 passes the read pointer to cause absence of data to be recorded onto the HDD 4, because the data transfer rate (recording rate) of the HDD 4 is set higher than the rate of image data (for example, 30 frames/sec in the NTSC scheme and 25 frames/sec in the PAL scheme).

After the system controller 54 has issued the instructions and had the respective sections perform the processes for image data recording, the process goes to step S6, where the system controller 54 generates response commands corresponding to the respective instructions and output those to the LINK 52. The LINK 52 packetizes the received response commands and output resulting packets to the PHY 51. The PHY 51 transmits, as asynchronous packets allocated thereto, the response commands to the editor 1 via the 1394 bus 11.

Similarly, if "opcode" is "PLAY," at step S5 the system controller 54 causes reproduction of the data stored in the HDD 4. Further, the system controller 54 outputs an instruction to the IDE controller 71 to have it convert reproduced data suitable for the IDE interface 12 that is supplied from the HDD 4 into ordinary data. Further, the system controller 54 controls the FIFO memory 61 via the LINK/FIFO controller 62 to have it store image data that is supplied from the IDE controller 71 and output the image data on a first-in first-out basis to the LINK 52.

If at this time the amount of stored image data is less than 3 frames, the FIFO memory 61 continues to set an empty flag until it stores image data of 3 frames, for instance. While the empty flag is set, the IDE controller 71 reproduces data blocks from the HDD 4, converts the data blocks into original image data blocks, and supplies those, for storage, to the FIFO memory 61.

The LINK 52 reads out the image data from the FIFO memory 61 on a frame-by-frame basis, packetizes the read-out image data, and output resulting packets to the PHY 51. The PHY 51 transmits those packets via the 1394 bus 11 as isochronous packets, whereby the packets are supplied to the editor 1.

The LINK/FIFO controller 62 informs the LINK 52 whether the data transfer direction is the recording direction or the playback direction.

By storing image data of 3 frames in the FIFO memory 61 as described above, even if the operation of reading out data from the HDD 4 temporarily delays due to a seek time or a retry operation of the HDD 4, there does not occur such an event that the write pointer of the FIFO memory 61 passes the read pointer to cause absence of reproduction data, because the data transfer rate (readout rate) of the HDD 4 is higher than the image data realtime transmission rate (for example, 30 frames/sec in the NTSC scheme and 25 frames/sec in the PAL scheme).

On the other hand, if "ctype/response" is judged to be an inquiry command at step S4, the process goes to step S7, where the system controller 54 performs corresponding controls. For example, in the case of an inquiry from the editor 1 about a power supply state of the conversion state 2, the head position of the HDD 4, a recording, playback, or stop state, or the like, the system controller 54 checks such a state. The process then goes to step S8, where the system controller 54 generates response commands corresponding to a check result of the state and has the LINK 52 output the response commands to the editor 1 via the 1394 bus 11.

If "ctype/response" is judged to be a support command at step S4, the process goes to step S9, where the system controller 54 executes corresponding processes. The process then goes to step S10, where the system controller 54 causes output of corresponding response commands.

On the other hand, if it is judged at step S3 that "subunit_type" is not VCR, the process goes to step S11, where other processes are executed. That is, in this case, it is not necessary to deal with the HDD 4 substantially as a VCR. Therefore, for example, a process of recording or reproducing data onto or from the HDD 4 is executed with the HDD 4 regarded literally as an HDD.

Figure 8:
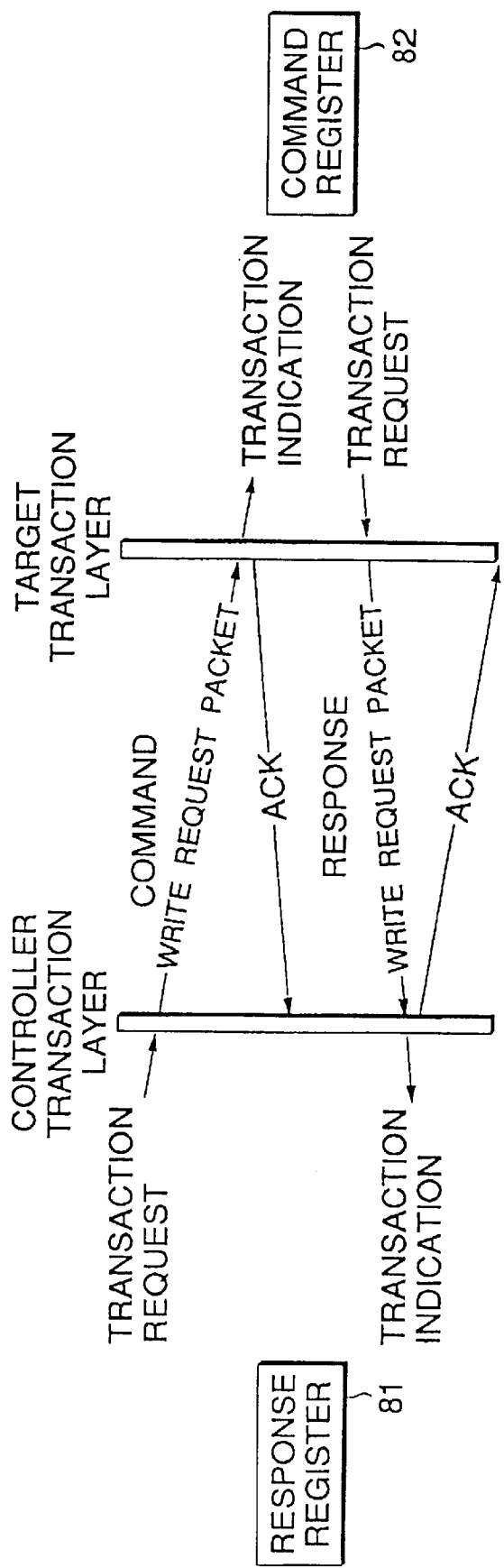
FIG. 8 illustrates exchanges of commands and responses in the AV system of FIG. 1.

FIG. 8 shows a basic flow of exchanges of commands and responses in the above-described operation. As shown in FIG. 8, an electronic apparatus in this embodiment that supports the function control protocol function has a response register 81 and a command register 82. As for the relationship between a controller (for instance, the editor 1) and a target (for instance, the conversion device 2), for example, when a command is output from the controller as a write request packet, the target stores the received command in the command register 82. The command register in which to store the command is specified by "destination_offset" shown in FIG. 2. Further, the target outputs, to the controller, "Ack" that acknowledges storage of the commend in the command register 82, and reads out the command that is stored in the command register to execute a corresponding process. The target returns, as a write request packet, a response corresponding to the executed process to the controller.

The controller stores, in the response register 81, the response that has been supplied from the target. Upon reception of the response, the controller returns "Ack" that acknowledges the reception to the target. Then, the controller reads out the response that is stored in the response register 81, and executes a corresponding process.

FIG. 9 shows flows of commands and data in a case where a 1394 interface command is output from the editor 1 and the HDD 4 is caused to execute a corresponding process. When the editor 1 outputs, as an AV/C command, a recording command by using, for instance, "opcode" via the 1394 bus 11, this command is captured by the system controller 54. In response to this command, the system controller 54 outputs an AV/C response of "Accept" and causes it to be supplied to the editor 1 via the 1394 bus 11.

At this time, the system controller 54 calculates a logical block address (LBA) based on the current head position, converts the command (RECORD) into an IDE command WRITE, and outputs a calculated LBA value and the command WRITE to the IDE controller 71. The IDE controller 71 converts the LBA into a specific sector address of the HDD 4 and converts the command WRITE into, for instance, WRITE SECTORS among a plurality of corresponding commands, thereby instructing the HDD 4 how to write data. Further, the IDE controller 71 forwards, to the HDD 4, image data that is supplied from the FIFO 61 and has the HDD 4 record the image data at the specified sectors.

When the writing has been effected in the above manner, the IDE controller 71 returns, to the system controller 54, a response indicating the completion of the writing.

Similar processes are thereafter executed by the IDE controller 71 and the HDD 4 until a command for stopping the writing operation is newly received (transferred).

When an AV/C command in which "opcode" indicates PLAY is supplied from the editor 1 via the 1394 bus 11, the system controller 54 receives it and outputs an AV/C response of "Accept" to the editor 1 via the 1394 bus 11.

Further, the system controller 54 converts the current head position to a LBA and converts a 1394 interface command PLAY into an IDE interface command READ, and the output those to the IDE controller 71. The IDE controller 71 converts the IDE command READ into a more specific command READ SECTORS and converts the LBA that indicates the execution position of the command into more specific values that indicate sectors, and output those to the HDD 4. In response to the received command, the HDD 4 reproduces data from the specified sectors and outputs the reproduced data to the IDE controller 71. The IDE controller 71 outputs the received reproduction data to the FIFO memory 61 and returns a response indicating the completion of the playback to the system controller 54.

Upon reception of the response indicating the completion of the playback, the system controller 54 again outputs a LBA and a command READ with predetermined timing, to cause similar processes to be thereafter executed repeatedly.

Also the above playback operation is repeated until an instruction to stop the playback operation is made.

Image data can be recorded or reproduced onto or from the HDD 4 in such a manner that in the editor 1 the same edit manipulations are made as would be done in recording or reproducing the image data onto or from a magnetic tape at a specified position.

Although the above description is directed to the case of using the 1394 interface and the IDE interface, other interfaces may be used.

Although the above embodiment is directed to the case where the HDD is used as a VCR, the important point is that the invention can be used to a case where a given AV apparatus is handled as another AV apparatus of a different kind.

As described above, according to the invention, a command to be used in controlling a second electronic apparatus that is of a different kind than a first electronic apparatus is captured and converted into a command suitable for a first interface. The first electronic apparatus is controlled in accordance with the converted command. Therefore, the first electronic apparatus can be handled in the same manner as the second electronic apparatus.

What is claimed is:

1. Data processing apparatus for modifying data received at an interface of one type to conform to a format of another interface of the same or different type, comprising, first control means for receiving from and/or transmitting packets of data to a first interface, for extracting information and control data from a data packet received from said first interface, for converting said information data into a format compatible with a second interface and for transmitting the format-converted information data to said second interface;

a memory for storing said control data, said stored control data controlling operating tasks of said data processing apparatus; and second control means for receiving from and/or transmitting packets of data to said second interface, for repacketizing data packets received from said second interface into a format compatible for transmission by said first interface, and for supplying the repacketized data to said first interface.

2. Data processing apparatus, comprising, first control means for receiving from and/or transmitting data to a first interface, and including a demodulator for demodulating a data packet received from the first interface and for extracting information and control data from the demodulated data packet, said first control means converting said information data into a format compatible with a second interface and transmitting the format-converted information data to said second interface;

a memory for storing said control data, said stored control data controlling operating tasks of said data processing apparatus; and second control means for receiving from and/or transmitting data packets to said second interface, for repacketizing said data packets received from said second interface into a format compatible for transmission by said first interface, and for modulating said packetized data for transmission by said first interface.

3. Data processing apparatus according to claim 2, wherein said first interface is an IDE interface.

4. Data processing apparatus according to claim 2, wherein said second interface is an IEEE 1394 interface.

5. Data processing apparatus according to claim 3, wherein said second interface is an IEEE 1394 interface.

6. Data processing apparatus according to claim 5, further comprising storing means provided between the first and second control means, for temporarily storing said information data that is exchanged between the demodulator and the IDE interface.

7. Data processing apparatus according to claim 6, wherein said information data includes image data.

8. Data processing apparatus according to claim 7, wherein said control data includes an analog video cassette recorder command of an asynchronous mode of an IEEE 1394 protocol.

9. A data processing method used in data processing apparatus for modifying data received at an interface of one type to conform to a fonnat of another interface of the same or different type, comprising the steps of:

receiving packets of data from a first interface or a second interface;

extracting information and control data from said data packet received from said first interface;

converting said information data into a format compatible with the second interface;

storing said control data, said stored control data controlling operating tasks of said data processing apparatus;

transmitting the format converted information data to said second interface when said received data packet is received from said first interface;

repacketizing data packets received from said second interface into a format compatible for transmission by said first interface; and supplying said repacketized data to said first interface.

10. Data processing method according to claim 9, wherein said first interface is an IDE interface.

11. Data processing method according to claim 9, wherein said second interface is an IE 1394 interface.

12. Data processing method according to claim 10, wherein said second interface is an IEEE 1394 interface.

13. Data processing method according to claim 9, further comprising the step of temporarily storing said information data immediately before said information data is converted.

14. Data processing method according to claim 13, wherein said information data includes image data.

15. Data processing method according to claim 14, wherein the second interface is an IEEE 1394 interface and said control data includes an analog video cassette recorder command of an asynchronous mode of an IEEE 1394 protocol.

* * * * *